US010970975B2

(12) United States Patent
Konecny et al.

(10) Patent No.: US 10,970,975 B2
(45) Date of Patent: Apr. 6, 2021

(54) END-TO-END SECURED CURRENCY DISPENSING

(71) Applicant: Diebold Nixdorf, Incorporated, North Canton, OH (US)

(72) Inventors: Ann Konecny, Uniontown, OH (US); Peter Guenther, Bielfeld (DE); Gennadij Liske, Herford (DE); Volker Krummel, Paderborn (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 16/800,155

(22) Filed: Feb. 25, 2020

(65) Prior Publication Data
US 2020/0273299 A1    Aug. 27, 2020

Related U.S. Application Data

(60) Provisional application No. 62/810,494, filed on Feb. 26, 2019.

(51) Int. Cl.
*G07F 19/00* (2006.01)
*H04L 9/32* (2006.01)

(52) U.S. Cl.
CPC .......... *G07F 19/203* (2013.01); *G07F 19/207* (2013.01); *H04L 9/3242* (2013.01); *H04L 9/3297* (2013.01)

(58) Field of Classification Search
None
See application file for complete search history.

(56) References Cited

U.S. PATENT DOCUMENTS 10,037,527 B2 *   7/2018   Han ..................... G06Q 20/10
2018/0211253 A1    7/2018   Ishikawa
2018/0300720 A1 * 10/2018   Tanaka ................. G07F 19/20

FOREIGN PATENT DOCUMENTS

EP          2913975 A2     9/2015

OTHER PUBLICATIONS

International Searching Authority; Written Opinion of the International Searching Authority; dated May 7, 2020; International application No. PCT/US2020/019613.

* cited by examiner

*Primary Examiner* — Kristy A Haupt
(74) *Attorney, Agent, or Firm* — Black, McCuskey, Souers & Arbaugh LPA

(57) ABSTRACT

A managing computing device positioned in an ATM can receive a dispense request for an amount of currency and account information from a user. A controller of a currency dispenser can generate a first number. The first number, the dispense request, and the account information can be sent to a remote, host computing device that shares a secret key with the controller. The host device can generate a first message authentication code (MAC) based on at least one of the first number and the amount of currency and can send it to the controller. The controller can generate a second MAC based on at least one of the first number and the amount of currency, confirm identity between the first and second MACs, and control the currency dispenser to dispense the amount of currency to the user.

20 Claims, 4 Drawing Sheets

END-TO-END SECURED CURRENCY DISPENSING

CROSS-REFERENCE TO RELATED APPLICATIONS

This application claims the benefit of U.S. Provisional Patent Application Ser. No. 62/810,494 for END-TO-END SECURED CURRENCY DISPENSING, filed on 2019 Feb. 26, which is hereby incorporated by reference in its entirety.

BACKGROUND

1. Field

The present disclosure relates to relates to automated transaction machines that can dispense currency.

2. Description of Related Prior Art

Automated transaction machines (ATMs) are well known. Most ATMs enable customers to carry out banking transactions. Common banking transactions that may be carried out by way of ATMs include the dispensing of cash, the making of deposits, the transfer of funds between accounts, the payment of bills, and account balance inquiries. The types of banking transactions a customer can carry out are determined by capabilities of the ATM. Other types of ATMs may print or dispense items of value such as coupons, tickets, wagering slips, vouchers, stamps, checks, food stamps, money orders, or traveler's checks.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In summary, the present disclosure relates to a method of dispensing currency from an ATM. The method can include receiving, with a managing computing device positioned in the ATM, a dispense request and account information from a user. The dispense request can include an amount of currency to be dispensed from a currency dispenser positioned in the ATM. The method can also include generating, with a controller of the currency dispenser, a first number and storing the first number in a memory communicating with the controller. The method can also include receiving the first number at a host computing device that is physically remote from the ATM. The method can also include receiving, at the host computing device, the dispense request and the account information. The method can also include generating, with the host computing device, a first message authentication code by applying a signing algorithm to at least one of the first number and the amount of currency to be dispensed. The signing algorithm can be based on a cryptographic key. The method can also include receiving, at the controller of the currency dispenser, at least the first message authentication code directly or indirectly from the host computing device. The method can also include retrieving the first number, with the controller of the currency dispenser and from the memory. The method can also include generating, with the controller of the currency dispenser, a second message authentication code by applying the signing algorithm to at least at least one of the first number and the amount of currency, the first number retrieved during the retrieving. The method can also include confirming, with the controller of the currency dispenser, identity between the first message authentication code and the second message authentication code. The method can also include dispensing, with the currency dispenser by the controller, the amount of currency in response to at least the confirming.

According to other features, generating the first message authentication code with the host computing device can be further defined as generating the first message authentication code by applying the signing algorithm to at least the amount of currency to be dispensed. The receiving of at least the first message authentication code at the controller of the currency dispenser can be further defined as receiving, at the controller of the currency dispenser, at least the first message authentication code from the host computing device and the amount of currency to be dispensed from the managing computing device. In addition, the generating of the second message authentication code with the controller of the currency dispenser can be further defined as generating, with the controller of the currency dispenser, the second message authentication code by applying the signing algorithm to at least the first number retrieved during the retrieving as well as the amount of currency to be dispensed. Also, the confirming of the identity with the controller of the currency dispenser can be further defined as confirming, with the controller of the currency dispenser, identity between the first message authentication code and the second message authentication code to thereby confirm that the amount of currency to be dispensed associated with the first message authentication code is identical to the amount of currency to be dispensed that was received from the managing computing device.

In other features, the method can also include transmitting, with the controller of the currency dispenser, a confirmation message to the managing computing device. The confirmation message can communicate that the amount of currency to be dispensed, that was associated with the first message authentication code, is identical to the amount of currency to be dispensed that was received from the managing computing device. This transmitting of the confirmation message can occur before the dispensing. The method can also include transmitting, with the managing computing device, in response to the transmitting of the confirmation message, a dispense command to the controller of the currency dispenser. The transmitting of the dispense command occurs before the dispensing. The dispensing can be further defined as dispensing, with the currency dispenser, the amount of currency in response to the confirming as well as to the transmitting of the dispense command.

According to additional features, the generating of the first message authentication code with the host computing device can be further defined as generating the first message authentication code by applying the signing algorithm to a composite of the first number and the amount of currency to be dispensed. The method can also further comprise transmitting, with the host computing device, only the first message authentication code to either of the controller of the currency dispenser and the managing computing device in response to the receiving the dispense request. The host computing device may not transmit the first number, the amount of currency to be dispensed, or the composite of the first number and the amount of currency to be dispensed to either of the controller of the currency dispenser and the managing computing device in response to the receiving the dispense request.

According to other features, the method can further comprise transmitting, with the host computing device, only the first message authentication code to either of the controller of the currency dispenser or the managing computing device in response to the receiving of the dispense request. The method can further comprise generating, with the controller of the currency dispenser, a third message authentication code by applying the signing algorithm to at least the first number. Also, the generating of the third message authentication code can occur before the receiving of the first number at the host computing device. The method can further comprise transmitting, with the controller of the currency dispenser, the third message authentication code and the first number to the managing computing device before the first number is received at the host computing device. The method can further comprise transmitting, with the managing computing device, the third message authentication code, the first number, the dispense request, and the account information to the host computing device. The method can further comprise generating, with the host computing device, a fourth message authentication code by applying the signing algorithm to at least the first number received by the transmitting the third message authentication code. The method can further comprise confirming, with the host computing device, identity between the third message authentication code and the fourth message authentication code, wherein the generating of the first message authentication code occurs at least partially in response to the confirming of the identity between the third message authentication code and the fourth message authentication code.

In other features, the generating of the first number may occur before and not be performed in response to the receiving the dispense request and the account information by the managing computing device. The method can further comprise transmitting, with the controller of the currency dispenser, the first number to the host computing device before the receiving of the dispense request and the account information by the managing computing device.

According to additional features, the generating of the first message authentication code can be further defined as generating, with the host computing device, the first message authentication code by applying the signing algorithm to at least the first number. The method can further comprise generating, with the host computing system, a dispense command to be executed by the controller of the currency dispenser to dispense the amount of currency. The method can further comprise transmitting, with the host computing system, the dispense command to the controller of the currency dispenser. The generating of the dispense command can be further defined as generating the dispense command to include a plurality of fields, wherein a first of the plurality of fields contains the first message authentication code. The generating of the dispense command can be further defined as generating the dispense command to include unencrypted data in at least some of the plurality of fields other than the first of the plurality of fields. The transmitting of the dispense command can be further defined as transmitting the dispense command to the controller of the currency dispenser in unencrypted format, whereby the controller of the currency dispenser can act on the dispense command upon receipt without initially decrypting.

According to other features, the dispensing of the amount of currency can be further defined as dispensing, with the currency dispenser, the amount of currency with the controller of the currency dispenser irresponsive to communications from the managing computing device.

BRIEF DESCRIPTION OF THE DRAWINGS

The detailed description set forth below references the following drawings.

DETAILED DESCRIPTION

Figure 1:
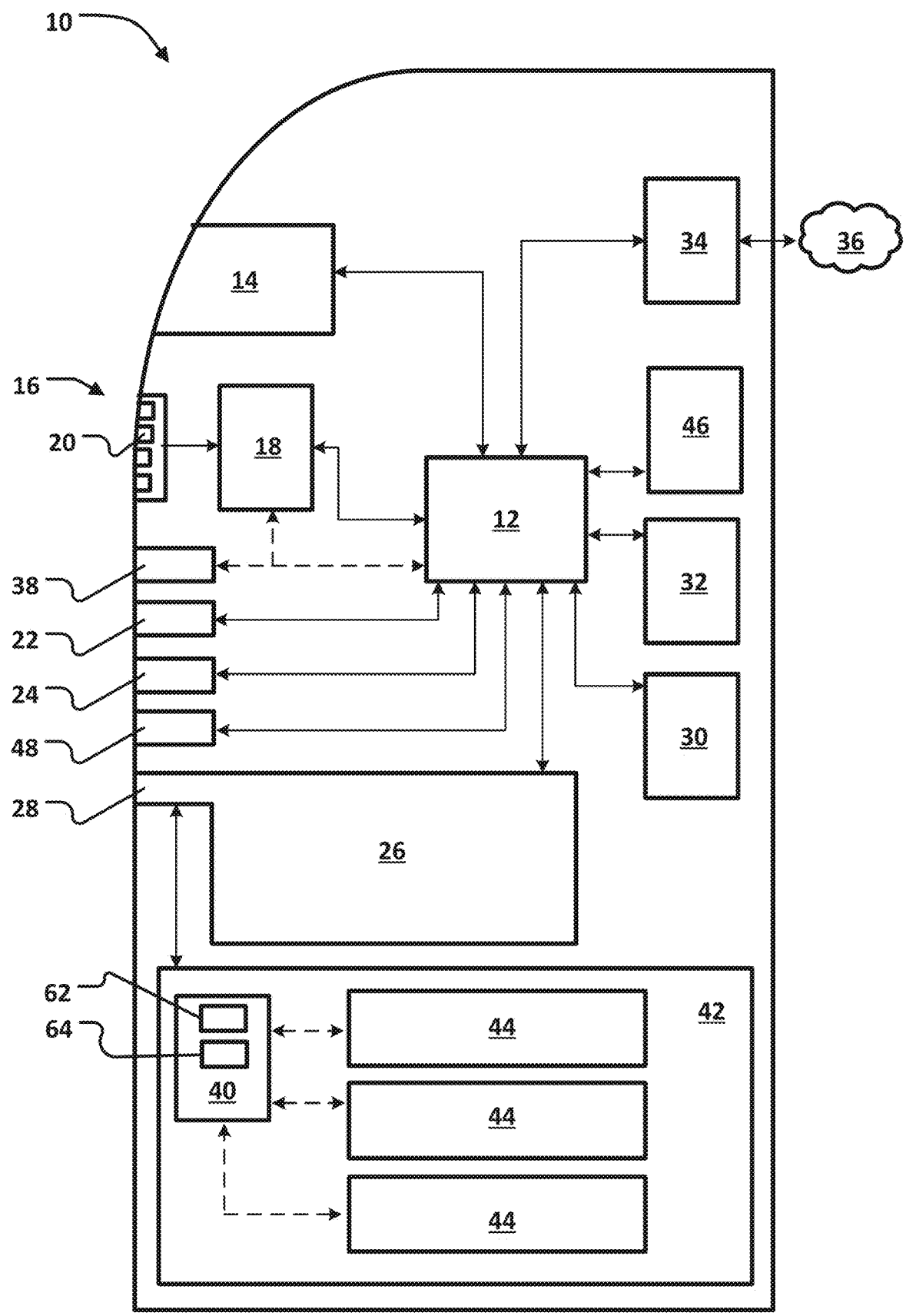
FIG. 1 is a functional block diagram of an exemplary ATM according to one or more implementations of the present disclosure.

The present disclosure, as demonstrated by the exemplary embodiments described below, can provide an improved method for dispensing currency. The method is secured and provides end-to-end authentication. Further, the method avoids over-burdening the system with, for example, excessive encryption and decryption. Embodiments of the present disclosure can prevent unauthorized dispenses from an ATM.

A system executing the method can include an ATM and a host computing device. The ATM can include a managing computing device and a controller of a currency dispenser of the ATM. In various embodiments of the present disclosure, the host computing device can be a banking core, a switch responsible for connection between different banking networks and/or for placing ATMs and a banking core in communication with one another, or the combination of a bank core and a switch.

A plurality of different embodiments of the present disclosure is shown in the Figures of the application. Similar method steps are shown in the various embodiments of the present disclosure. Similar method steps have been numbered with a common reference numeral and have been differentiated by an alphabetic suffix. Also, to enhance consistency, the method steps in any particular drawing share the same alphabetic suffix even if a particular method step is shown in less than all embodiments. Similar method steps are carried out similarly, produce similar results, and/or have the same purpose unless otherwise indicated by the drawings or this specification. Furthermore, a particular method step of one embodiment can replace a corresponding method step in another embodiment or can supplement the steps of other embodiments unless otherwise indicated by the drawings or this specification.

Referring now to the drawings, FIG. 1 discloses a functional block diagram of an exemplary ATM 10 according to one or more implementations of the present disclosure. The ATM 10 includes different structures and subsystems for receiving input from a user and executing transactions. The ATM 10 includes a computing device 12, also referred to as a "managing computing device" or the "ATM PC." The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during the completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive items such as checks. An exemplary article exchange unit 26 can include a drum on which received items are stored with a web wound around the drum. The exemplary article exchange unit 26 includes a slot 28 open to an exterior of the ATM 10 for the receipt of such items. In other embodiments of the present disclosure, an article exchange unit can be configured to facilitate the receipt of other items, different than paper. The article exchange unit 26 can include one or more sensors and can transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user and held by the article exchange unit 26.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user, referenced at 56 in FIG. 2. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes an advanced function dispenser (AFD) 40, also referred to as a "cash module" or a currency dispenser. The AFD 40 can dispense banknotes, such as currency. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The AFD 40 thus communicates with the slot 28 in parallel with the article exchange unit 26. The exemplary AFD 40 can communicate with and be controlled by the computing device 12 for at least some operations. Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled. The AFD 40 includes a controller 62 that directs the operations of the AFD 40 and communicates with the ATM PC 12. In various operations, the controller 62 can receive and execute commands from the computing device 12 and can also act independently of the computing device 12. The AFD 40 can also include memory 64 communicating with the controller 62. The controller 62 can read and write to the memory 64.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 2:
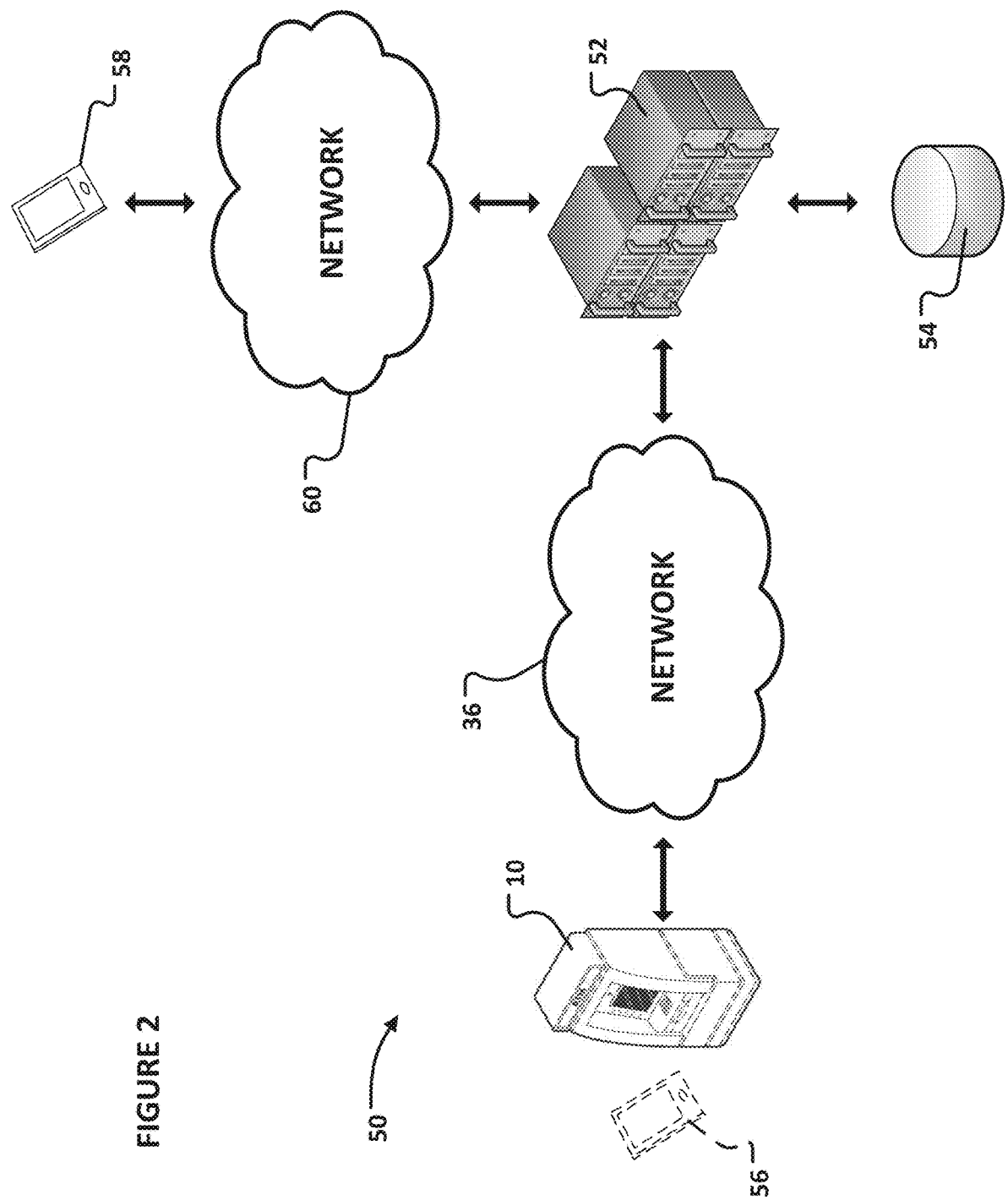
FIG. 2 is a functional block diagram of an exemplary financial transaction computing system according to one or more implementations of the present disclosure.

FIG. 2 is a functional block diagram of an exemplary system 50 according to one or more implementations of the present disclosure. The exemplary system 50 includes the ATM 10. The exemplary system 10 also includes a host computing device 52, which is a server computing device in the exemplary embodiment of the present disclosure. The host computing device 52 is physically remote from the ATM 10. The computing device 52 can be a banking core and can access a database 54 of accounts maintaining by a financial institution. In various embodiments, the host computing device 52 could be a switch or a combination of a switch and a banking core. The exemplary computing device 52 has one or more processors and a non-transitory, computer readable medium. The system 50 can be operated by a financial institution and the user can be an account holder of the financial institution. Other implementations of the present disclosure, by way of example and not limitation, can be a system operated by a merchant of consumer goods, a provider of healthcare-related products, or a delivery company.

The ATM 10 and the computing device 52 can communicate over the network 36. Transmissions over the network 36 may be encrypted and may include Message Authentication Codes (MACs) to enhance security. MACs are appended to messages sent from and received by a device such as the ATM 10. MACs verify that the messages sent and the messages received are identical and also confirm that messages originate from an approved source. The computing devices 12 and 52 can also apply Transport Layer Security (TLS) or Secure Sockets Layer (SSL) protocols and include respective firewalls to enhance security. The computing device 52 can also communicate with user computing devices, such as a user's tablet computer 58, over a network 60. The network 60 can be a local area network (LAN), a wide area network (WAN) such as the Internet, a Multiprotocol label switching (MPLS) network, a cellular network such as operated by cellular phone companies, or any combination thereof. In the exemplary embodiment, the host computing device 52 can communicate directly with both of the managing computing device 12 and the controller 62 or can communicate with the controller 62 through the managing computing device 12.

Figure 3:
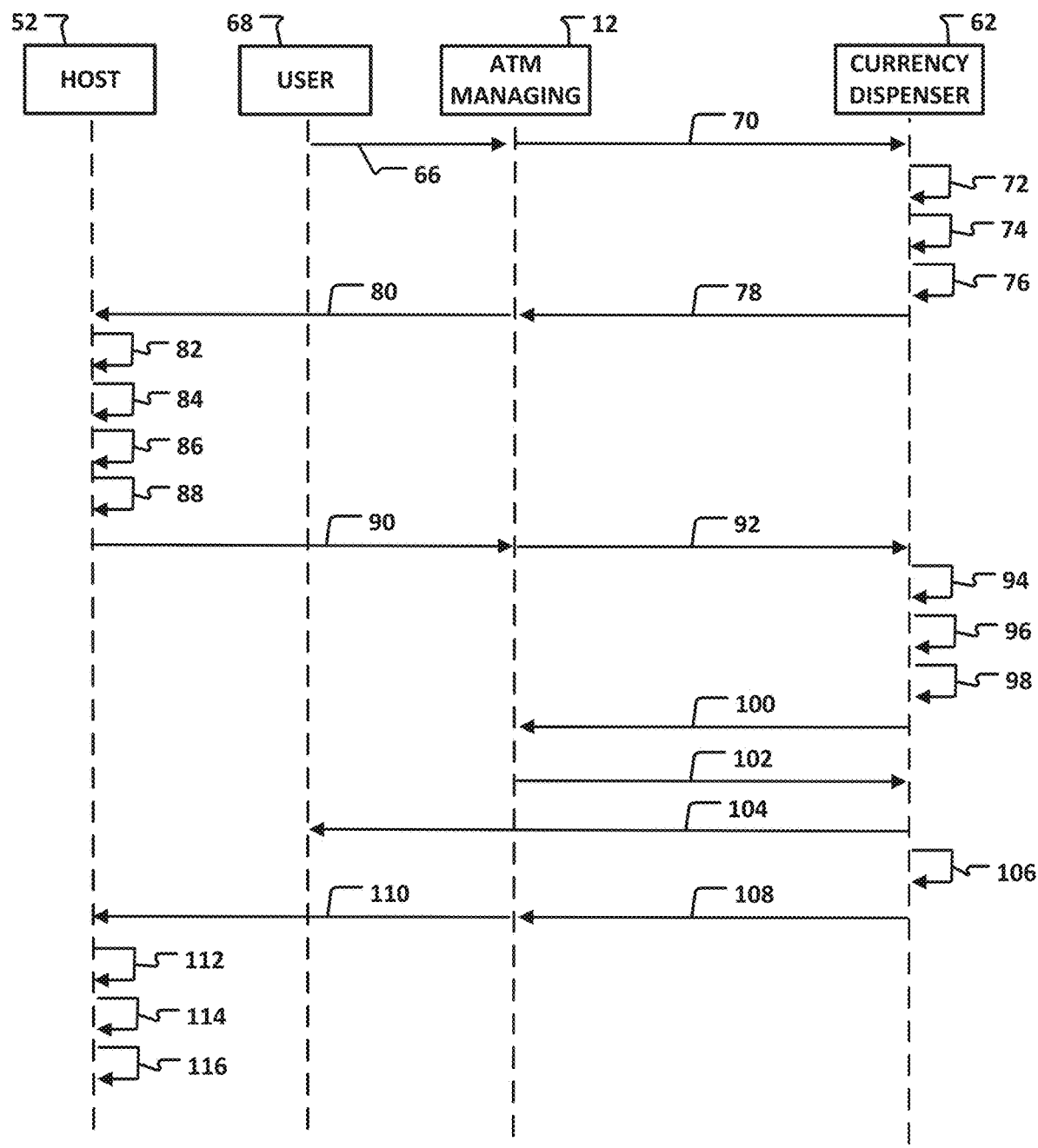
FIG. 3 is a simplified activity diagram according to a first embodiment of the present disclosure.

An exemplary method according to a first embodiment of the present disclosure is illustrated by the activity diagram of FIG. 3. As referenced at 66, in the first embodiment of the present disclosure, the managing computing device 12 receives a dispense request and account information from a user 68. The dispense request can include an amount of currency to be dispensed from the currency dispenser 40 positioned in the ATM 10. In one or more embodiments of the present disclosure, the amount to dispense can be defined by a total currency amount (such as $200 USD for example); the number of bills to dispense from particular cassettes 44 according to their position (such as, for example, one bill from a first cassette and two bills from a third cassette); or the number of bills to dispense from each cassette according to their denominations, where each denomination is assigned a letter (such as, for example, one 'A' bill and two 'C' bills). The managing computing device 12 can receive the account information from the card reader 22 after the card reader 22 has read data from a card of the user 68. Account information can also include the PIN of the user 68, received from the key pad 16 and encryption module 18. The amount of currency to be dispensed can be received from the user 68 through the key pad 16.

As referenced at 70, in the first exemplary embodiment of the present disclosure, the managing computing device 12 opens communication with the controller 62 by transmitting any data required by the controller 62 to start a new transaction. The exemplary first embodiment does not have any requirements as to this data because the exemplary controller 62 may not be able to verify any of this initial data received from the managing computing device 12. However, transmission of such data can be used by other, overlying protocols in one or more embodiments of the present disclosure to bind any transaction/user data to a fresh transaction. If any pre-transaction data is not required, activity 70 can merely be a command to commence with subsequent activities.

As referenced at 72, in the first exemplary embodiment of the present disclosure, the controller 62 confirms that the last authorized transaction is finished and, if necessary, performs any required computations (locally) to finish the last, unfinished transaction. As referenced at 74, in the first exemplary embodiment of the present disclosure, the controller 62 generates a first number and stores the first number in memory 64. Any data received during activity 70 can also be written to memory 64. The first number can be denoted as a "challenge" or a "transaction identifier." The first number is generated and applied in the first exemplary embodiment to ensure that an approved transaction can only be carried out by the controller 62 once. The exemplary first number or challenge is derived from a challenge set $R_c \{0, 1\}^n$ for n greater than or equal to sixty-four.

As referenced at 76, in the first exemplary embodiment of the present disclosure, the controller 62 generates a MAC by applying a signing algorithm to the first number and any data received during activity 70. The algorithm, as used in this context, can be viewed as a "generating" algorithm. This MAC will be designated as the "third" MAC to be consistent with the claims as-filed. The third MAC can be applied to a composite of the first number and any data received during activity 70. In other words, the first number and the data received during activity 70 can be distinct parts or fields of a single message created by the controller 62 and the controller 62 can apply the signing algorithm to this single, composite message. The signing algorithm is based on a cryptographic key shared by the controller 62 and the host computing device 52. In the first exemplary embodiment, the managing computing device 12 does not possess the cryptographic key shared by the controller 62 and the host computing device 52.

As referenced at 78, in the first exemplary embodiment of the present disclosure, the controller 62 transmits the third MAC and the first number to the managing computing device 12. As referenced at 80, in the first exemplary embodiment of the present disclosure, the managing computing device 12 transmits the third MAC, the first number, the dispense request, the account information, and any data received by the controller 62 during activity 70 to the host computing device 52. It is noted that the dispense request includes the amount of currency that is to be dispensed if the transaction is ultimately approved. At activity 80, the managing computing device 12 can also include any other data required by the host computing device 52 to further resolution of the transaction that has been requested by the user 68.

It is noted that, prior to the activities shown in any of the embodiments, a trust between the host computing device 52, the ATM managing computing device 12, and the controller 62 will have been established. Such trust can have been established by exchanging respective certificates, or applying another trust-establishing protocol. Further, the common cryptographic key will have been shared between the host computing device 52 and the controller 62 of the currency dispenser 40. The ASC X9 TR 34-2012, Interoperable Method for Distribution of Symmetric Keys can be applied to distribute keys from the host computing device 52 to the controller 62.

The host computing device 52 receives the third MAC, the first number, the dispense request, the account information, and any data received by the controller 62 during activity 70 as a result of activity 80. As referenced at 82, in the first exemplary embodiment of the present disclosure, the host computing device 52 generates a MAC by applying the signing algorithm to the first number and any data received by the controller 62 during activity 70. As described above, the algorithm can be applied to a composite of the first number and the data received during activity 70 in one or more embodiments of the present disclosure. This MAC will be designated as the "fourth" MAC to be consistent with the claims as-filed. The signing algorithm applied by the host computing device 52 is the same as the signing algorithm applied by the controller 62 during creation of the third MAC. When applied by the host computing device 52 during activity 82, the "signing" algorithm can also be denoted as a "verifying" algorithm. Thus, the fourth MAC is generated by applying the same algorithm used to generate the third MAC and, further, is applied to the same underlying data as was applied in generating the third MAC.

As referenced at 84, in the first exemplary embodiment of the present disclosure, the host computing device 52 confirms identity between the third MAC and the fourth MAC. This confirms that data received as a result of activity 80 was transmitted from the ATM 10. As referenced at 86, in the first exemplary embodiment of the present disclosure, the host computing device 52 accesses the account data associated with the user 68 to determine if the dispense request can be approved.

As referenced at 88, in the first exemplary embodiment of the present disclosure, the host computing device 52 generates a MAC by applying the signing algorithm to the first number, the amount of currency to be dispensed, and any data received by the controller 62 during activity 70. The algorithm, as used in this context, can be viewed as a "generating" algorithm. This MAC will be designated as the "first" MAC to be consistent with the claims as-filed. Generation of the first MAC occurs, at least partially, in response to confirming identity between the third MAC and the fourth MAC in activity 84. In other words, if identity between the third MAC and the fourth MAC is not confirmed in activity 84, the transaction is terminated. The first MAC can be a composite of the first number, the amount of currency to be dispensed, and any data received by the controller 62 during activity 70 in one or more implementations of the present disclosure.

As referenced at 90, in the first exemplary embodiment of the present disclosure, the host computing device 52 transmits only the first MAC to the managing computing device 12. The first MAC is thus ultimately sent in response to receiving the dispense request in activity 80. In the first exemplary embodiment, the host computing device 52 does not transmit the first number, the amount of currency to be dispensed, any composite of the first number and the amount of currency to be dispensed, nor any data received by the controller 62 during activity 70 to either the controller 62 or the managing computing device 12. Thus, in the first exemplary embodiment only a MAC is transmitted, unlike activity 80 and also unlike known uses of message authentication codes wherein a message and a MAC associated with the message are sent. This reduces the size of the transmission and, as set forth below, simplifies processing upon receipt.

As referenced at 92, in the first exemplary embodiment of the present disclosure, the controller 62 of the currency dispenser 40 receives the first MAC from the host computing device 52 through the managing computing device 12 and also receives the amount of currency to be dispensed from the managing computing device 12.

As referenced at 94, in the first exemplary embodiment of the present disclosure, the controller 62 of the currency dispenser 40 retrieves the first number and any data received during activity 70 from memory 64. As referenced at 96, in the first exemplary embodiment of the present disclosure, the controller 62 generates a MAC by applying the signing algorithm to the first number and any data received during activity 70 (read from memory 64) and the amount of currency to be dispensed (received from the managing computing device 12 during activity 92). The algorithm, as used in this context, can be viewed as a "verifying" algorithm. This MAC will be designated as the "second" MAC to be consistent with the claims as-filed. The second MAC can be based on a composite of the first number, any data received during activity 70, and the amount of currency to be dispensed in one or more implementations of the present disclosure. Thus, the second MAC is generated by applying the same algorithm used to generate the first MAC and, further, upon the same underlying data as the first MAC.

As referenced at 98, in the first exemplary embodiment of the present disclosure, the controller 62 of the currency dispenser 40 confirms identity between the first MAC and the second MAC. Identity between the first and second MACs confirms that the host computing device 52 has approved dispensing the amount of currency requested by the user 68. The amount of currency to be dispensed that is received from the host computing device 52, contained within the first MAC, is confirmed to be the same amount of currency received directly from the managing computing device 12.

As referenced at 100, in the first exemplary embodiment of the present disclosure, the controller 62 of the currency dispenser 40 transmits a confirmation message to the managing computing device 12 that the amount of currency to be dispensed that was received from the host computing device 52 is the same amount of currency received directly from the managing computing device 12. As referenced at 102, in the first exemplary embodiment of the present disclosure, the managing computing device 12 then transmits a dispense command to the controller 62 of the currency dispenser 40 in response to receiving the confirmation message. As referenced at 104, in the first exemplary embodiment of the present disclosure, the controller 62 of the currency dispenser 40 then dispenses the amount of currency to the user 68. The amount of currency dispensed during activity 104 can be less than the authorized amount of currency to be dispensed if there was insufficient currency in the cassettes or an error occurred during dispense.

At 106, the controller 62 generates a MAC by applying the signing algorithm to the first number and the amount of currency dispensed during activity 104. The algorithm, as used in this context, can be viewed as a "generating" algorithm. This MAC will be referenced as the fifth MAC. As referenced at 108, in the first exemplary embodiment of the present disclosure, the controller 62 transmits the fifth MAC to the managing computing device 12. As referenced at 110, in the first exemplary embodiment of the present disclosure, the managing computing device 12 transmits the fifth MAC and the amount dispensed to the host computing device 52.

As referenced at 112, in the first exemplary embodiment of the present disclosure, the host computing device 52 generates a MAC by applying the signing algorithm to the first number and the amount dispensed. The algorithm, as used in this context, can be viewed as a "verifying" algorithm. The host computing device 52 had previously received the first number as a result of activity 80. This MAC will be designated as the "sixth" MAC. As referenced at 114, in the first exemplary embodiment of the present disclosure, the host computing device 52 confirms identity between the fifth MAC and the sixth MAC. This confirms that the transaction has been completed. As referenced at 116, in the first exemplary embodiment of the present disclosure, the host computing device 52 writes the finalized transaction to the database 54.

In the first exemplary embodiment, the controller 62 authenticates only the amount to be dispensed. In one or more other embodiments of the present disclosure, additional security-relevant data about the dispensing process could be sent to the host computing device 52. For example, the controller 62 could additionally send transaction status information in the fifth MAC. As already noted, in the first exemplary embodiment, the managing computing device 12 controls the messages sent by the controller 62 and hence, this transaction status information could be sent to the host computing device 52 by the managing computing device 12. In order to limit possible impacts, controller 62 can provide transaction status information of the last authorized transaction with each new dispense request. The transaction status information can be included in each MAC, as desired.

In the first exemplary embodiment, the controller 62 confirms to the host computing device 52 that the amount has been dispensed. In one or more other embodiments of the present disclosure, the host computing device 52 may be configured to ask for the confirmation from the controller after activity 90. Further, in such embodiment(s), the host computing device 52 can be configured to withhold approval of another transaction until confirmation of a previously-approved transaction is received. As a result, the first exemplary embodiment of the present disclosure can prevent unauthorized dispenses from the ATM 10.

Figure 4:
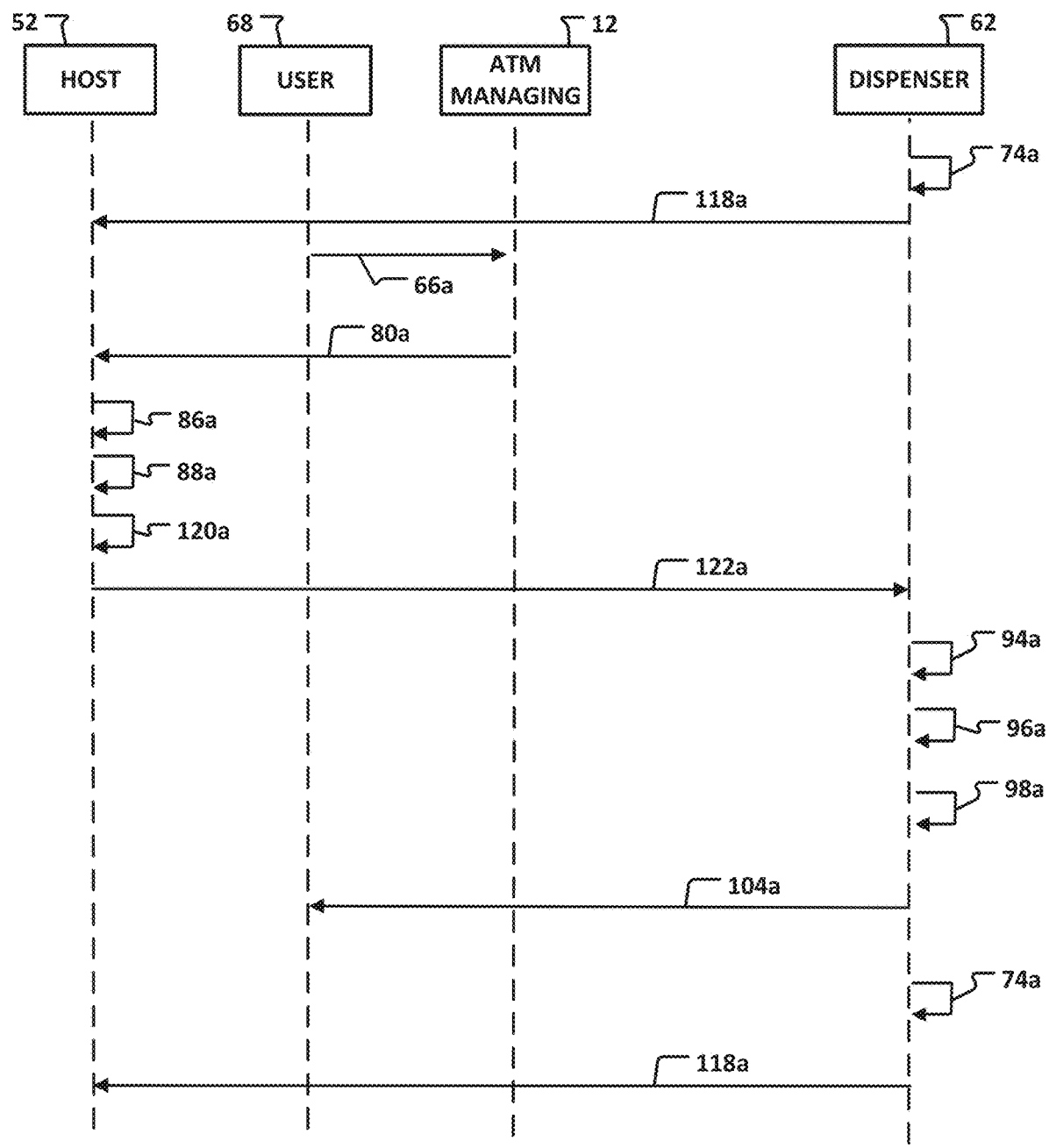
FIG. 4 is a simplified activity diagram according to a second exemplary embodiment of the present disclosure.

An exemplary method according to a second exemplary embodiment of the present disclosure is illustrated by the activity diagram of FIG. 4. As referenced at 74a, in the second exemplary embodiment of the present disclosure, the controller 62 generates a first number and stores the first number in memory 64. The first number can be denoted as a "challenge" or a "transaction identifier." The first number in the second exemplary embodiment is generated as a time variant number, such as a date and time. The first number is applied in the second exemplary embodiment to ensure that a transaction approval can only be applied to dispense currency once. A comparison of FIGS. 3 and 4 shows that, in the second exemplary embodiment, the first number is generated before and not in response to receiving a dispense request from the user 68.

As referenced at 118a, in the second exemplary embodiment of the present disclosure, the controller 62 transmits the first number directly to the host computing device 52. The managing computing device 12 can act a pass-through for the transmission during activity 118a.

As referenced at 66a, in the second exemplary embodiment of the present disclosure, the managing computing device 12 receives a dispense request and account information from the user 68. Any amount time may pass between activity 118a and activity 66a. The dispense request can include an amount of currency to be dispensed from the currency dispenser 40 positioned in the ATM 10. As referenced at 80a, in the second exemplary embodiment of the present disclosure, the managing computing device 12 transmits the dispense request and the account information to the host computing device 52.

As referenced at 86a, in the second exemplary embodiment of the present disclosure, the host computing device 52 accesses the account data associated with the user 68 to determine if the dispense request can be approved. If the transaction is approved, as referenced at 88a in the second exemplary embodiment of the present disclosure, the host computing device 52 generates a MAC by applying the signing algorithm to the first number and the amount of currency to be dispensed. The algorithm, as used in this context, can be viewed as a "generating" algorithm. This MAC will be designated as the "first" MAC to be consistent with the claims as-filed.

As referenced at 120*a*, in the second exemplary embodiment of the present disclosure, the host computing device 52 generates a dispense command to be executed by the controller 62 of the currency dispenser 40 to dispense the amount of currency. The dispense command built by the host computing device 52 can include a plurality of fields and one of the plurality of fields can contain the first MAC. At least some and/or the remainder of the fields can include unencrypted data. The dispense command can also include the amount of currency to be dispensed. The dispense command itself can be unencrypted. In other embodiments, the first number itself can be directly included in a field of the dispense command and the host computing device 52 can encrypt the entire dispense command. In such an embodiment, the dispensed command can be decrypted by the controller 62 and generating the second MAC would not be required. As referenced at 122*a*, in the second exemplary embodiment of the present disclosure, the host computing device 52 can transmit the dispense command to the controller 62 of the currency dispenser 40.

As referenced at 94*a*, in the second exemplary embodiment of the present disclosure, the controller 62 of the currency dispenser 40 then reads the first number from memory 64. As referenced at 96*a*, in the second exemplary embodiment of the present disclosure, the controller 62 generates a MAC by applying the signing algorithm to the first number and the amount of currency to be dispensed. The algorithm, as used in this context, can be viewed as a "verifying" algorithm. This MAC will be designated as the "second" MAC to be consistent with the claims as-filed. Thus, the second MAC is generated by applying the same algorithm used to generate the first MAC and, further, upon the same underlying data as the first MAC.

As referenced at 98*a*, in the second exemplary embodiment of the present disclosure, the controller 62 of the currency dispenser 40 confirms identity between the first MAC and the second MAC. Identity between the first and second MACs confirms that the host computing device 52 has approved dispensing the amount of currency requested by the user 68. A comparison of FIGS. 3 and 4 shows that, in the second exemplary embodiment, the amount of currency to be dispensed is not received by the controller 62 from the managing computing device 12. The amount of currency can be set forth in a field of the dispense command received in activity 122*a*. As referenced at 104*a*, in the second exemplary embodiment of the present disclosure, the controller 62 of the currency dispenser 40 dispenses the amount of currency to the user 68. Thus, in the second exemplary embodiment of the present disclosure, an unauthorized dispense from the ATM 10 is prevented.

In the second exemplary embodiment, the dispense command is transmitted to the controller 62 of the currency dispenser 40 in unencrypted format, except for the first MAC, which is contained in one field of the command. As a result, the controller 62 of the currency dispenser 40 can act on the dispense command without initially decrypting. Viewed another way, the dispense command can be structured to minimize the extent of information that is encrypted to, in turn, minimize the burden in processing the command. Some of the fields of the dispense command can be processed with any decryption processing, speeding the overall processing and shortening the time required for completion of the transaction.

FIG. 4 also shows that, after dispensing at 104*a*, the controller 62 can repeat activities 74*a* and 118*a* in advance of the next request from another user. FIG. 4 also shows that the dispensing of currency can be completed by the controller 62 irresponsive to communications from the managing computing device 12. FIG. 4 shows no communication between the managing computing device 12 and the controller 62 during completion of a transaction in which currency is dispensed.

Additional activities can be taken in one or more embodiments to further secure the dispensing of currency and prevent unauthorized dispenses from the ATM 10. For example, a time limit can be enforced by the controller 62 in the first embodiment, wherein the controller 62 must receive the first MAC within some predetermined period of time after sending the third MAC. This condition sets a maximum time period between two activities. In another example, a time limit can be enforced by the controller 62 wherein the controller 62 must not have received the first MAC within some predetermined period of time after the last currency dispensing. This condition sets a minimum time period between two activities.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure and, if so, no such invention is disclaimed or abandoned or dedicated to the public. It is noted that an "invention" is defined strictly by the content of a patent claim and not by what is written in a detailed description.

What is claimed is:

1. A method of dispensing currency from an automated transaction machine (ATM) comprising:

receiving, with a managing computing device positioned in the ATM, a dispense request and account information from a user, the dispense request including an amount of currency to be dispensed from a currency dispenser positioned in the ATM;

generating, with a controller of the currency dispenser, a first number and storing the first number in a memory communicating with the controller;

receiving the first number at a host computing device that is physically remote from the ATM;

receiving, at the host computing device, the dispense request and the account information;

generating, with the host computing device, a first message authentication code by applying a signing algorithm to at least one of the first number and the amount of currency to be dispensed, the signing algorithm based on a cryptographic key;

receiving, at the controller of the currency dispenser, at least the first message authentication code from the host computing device;

receiving, at the controller of the currency dispenser, the amount of currency to be dispensed;

retrieving, with the controller of the currency dispenser, from the memory, the first number;

generating, with the controller of the currency dispenser, a second message authentication code by applying the signing algorithm to at least one of the first number and the amount of currency to be dispensed, the first number retrieved during said retrieving;

confirming, with the controller of the currency dispenser, identity between the first message authentication code and the second message authentication code;

dispensing, with the currency dispenser by the controller, the amount of currency in response to at least said confirming;

generating, with the controller of the currency dispenser, a fifth message authentication code by applying the signing algorithm to at least the first number and the amount of currency dispensed during said dispensing;

transmitting, with the controller of the currency dispenser, the fifth message authentication code to the host computing device;

generating, with the host computing device, a sixth message authentication code by applying the signing algorithm to the first number and the amount of currency to be dispensed; and confirming, with the host computing device, identity between the fifth message authentication code and the sixth message authentication code.

2. The method of claim 1 wherein said generating the first message authentication code with the host computing device is further defined as generating the first message authentication code by applying the signing algorithm to at least the amount of currency to be dispensed.

3. The method of claim 2 wherein:

said receiving the amount of currency to be dispensed at the controller of the currency dispenser is further defined as receiving the amount of currency to be dispensed at the controller of the currency dispenser from the managing computing device; and said generating the second message authentication code with the controller of the currency dispenser is further defined as generating, with the controller of the currency dispenser, the second message authentication code by applying the signing algorithm to at least the first number retrieved during said retrieving as well as the amount of currency to be dispensed received from the managing computing device.

4. The method of claim 3 wherein said confirming identity with the controller of the currency dispenser is further defined as confirming, with the controller of the currency dispenser, identity between the first message authentication code and the second message authentication code to thereby confirm that the amount of currency to be dispensed associated with the first message authentication code received from the host computing device is identical to the amount of currency to be dispensed that was received from the managing computing device.

5. The method of claim 4 further comprising:

transmitting, with the controller of the currency dispenser, a confirmation message to the managing computing device, wherein the confirmation message communicates that the amount of currency to be dispensed associated with the first message authentication code is identical to the amount of currency to be dispensed that was received from the managing computing device, said transmitting occurring before said dispensing; and transmitting, with the managing computing device, in response to said transmitting the confirmation message, a dispense command to the controller of the currency dispenser, said transmitting the dispense command occurring before said dispensing; and wherein said dispensing is further defined as dispensing, with the currency dispenser, the amount of currency in response to said confirming as well as said transmitting the dispense command.

6. The method of claim 1 wherein said generating the first message authentication code with the host computing device is further defined as generating the first message authentication code by applying the signing algorithm to a composite of the first number and the amount of currency to be dispensed.

7. The method of claim 6 further comprising:

transmitting, with the host computing device, only the first message authentication code to either of the controller of the currency dispenser and the managing computing device in response to said receiving the dispense request, the host computing device not transmitting the first number, the amount of currency to be dispensed, nor the composite of the first number and the amount of currency to be dispensed to either of the controller of the currency dispenser and the managing computing device in response to said receiving the dispense request.

8. The method of claim 1 further comprising:

transmitting, with the host computing device, only the first message authentication code to either of the controller of the currency dispenser and the managing computing device in response to said receiving the dispense request.

9. The method of claim 1 further comprising:

generating, with the controller of the currency dispenser, a third message authentication code by applying the signing algorithm to at least the first number, said generating the third message authentication code occurring before said receiving the first number at the host computing device; and transmitting, with the controller of the currency dispenser, the third message authentication code and the first number to the managing computing device before said receiving the first number at the host computing device; and transmitting, with the managing computing device, the third message authentication code, the first number, the dispense request, and the account information to the host computing device.

10. The method of claim 9 further comprising:

generating, with the host computing device, a fourth message authentication code by applying the signing algorithm to at least the first number received by said transmitting the third message authentication code; and confirming, with the host computing device, identity between the third message authentication code and the fourth message authentication code, wherein said generating the first message authentication code occurs at least partially in response to said confirming identity between the third message authentication code and the fourth message authentication code.

11. The method of claim 9 wherein said dispensing is further defined as:

dispensing, with the currency dispenser by the controller, the amount of currency in response to at least said confirming unless greater than a predetermined period of time elapsed between said transmitting, with the controller of the currency dispenser, the third message authentication code and said receiving, at the controller of the currency dispenser, at least the first message authentication code from the host computing device.

12. The method of claim 1 wherein said generating the first number occurs before said receiving the dispense request and the account information by the managing computing device and is not performed in response to said receiving the dispense request and the account information by the managing computing device.

13. The method of claim 12 further comprising:
transmitting, with the controller of the currency dispenser, the first number to the host computing device before said receiving the dispense request and the account information by the managing computing device.

14. The method of claim 1 wherein said generating the first message authentication code is further defined as generating, with the host computing device, the first message authentication code by applying the signing algorithm to both the first number and the amount of currency to be dispensed.

15. The method of claim 14 further comprising:
generating, with the host computing system, a dispense command to be executed by the controller of the currency dispenser to dispense the amount of currency; and
transmitting, with the host computing system, the dispense command to the controller of the currency dispenser.

16. The method of claim 15 wherein said generating the dispense command is further defined as generating the dispense command to include a plurality of fields and wherein a first of the plurality of fields contains the first message authentication code.

17. The method of claim 16 wherein said generating the dispense command is further defined as generating the dispense command to include unencrypted data in at leas some of the plurality of fields other than the first of the plurality of fields.

18. The method of claim 16 wherein said transmitting the dispense command is further defined as transmitting the dispense command to the controller of the currency dispenser in unencrypted format, whereby the controller of the currency dispenser can act on the dispense command upon receipt without initially decrypting.

19. The method of claim 1 wherein said dispensing is further defined as:
dispensing, with the currency dispenser by the controller, the amount of currency in response to at least said confirming unless less than a predetermined period of time elapsed since a previous dispensing.

20. A method of dispensing currency from an automated transaction machine (ATM) comprising:
receiving, with a managing computing device positioned in the ATM, a dispense request and account information from a user, the dispense request including an amount of currency to be dispensed from a currency dispenser positioned in the ATM;
generating, with a controller of the currency dispenser, a first number and storing the first number in a memory communicating with the controller;
receiving the first number at a host computing device that is physically remote from the ATM;
receiving, at the host computing device, the dispense request and the account information;
generating, with the host computing device, a first message authentication code by applying a signing algorithm to at least one of the first number and the amount of currency to be dispensed, the signing algorithm based on a cryptographic key;
receiving, at the controller of the currency dispenser, at least the first message authentication code from the host computing device;
receiving, at the controller of the currency dispenser, the amount of currency to be dispensed;
retrieving, with the controller of the currency dispenser, from the memory, the first number;
generating, with the controller of the currency dispenser, a second message authentication code by applying the signing algorithm to at least one of the first number and the amount of currency to be dispensed, the first number retrieved during said retrieving;
confirming, with the controller of the currency dispenser, identity between the first message authentication code and the second message authentication code;
dispensing, with the currency dispenser by the controller, the amount of currency in response to at least said confirming; and
wherein said dispensing the amount of currency is further defined as dispensing, with the currency dispenser, the amount of currency with the controller of the currency dispenser irresponsive to communications from the managing computing device.

* * * * *